(12) United States Patent
Tang

(10) Patent No.: US 11,503,263 B2
(45) Date of Patent: Nov. 15, 2022

(54) CHROMA KEY AND PRESENTATION SYSTEM, METHOD, AND KIT

(71) Applicant: UNI-GLORY HOLDINGS LIMITED, Kowloon (HK)

(72) Inventor: Long Hin Tang, Shatin (HK)

(73) Assignee: UNI-GLORY HOLDINGS LIMITED, Kowloon (HK)

( * ) Notice: Subject to any disclaimer, the term of this patent is extended or adjusted under 35 U.S.C. 154(b) by 0 days.

(21) Appl. No.: 17/462,953

(22) Filed: Aug. 31, 2021

(65) Prior Publication Data
US 2022/0070424 A1 Mar. 3, 2022

(30) Foreign Application Priority Data
Sep. 1, 2020 (GB) ...................................... 2013713

(51) Int. Cl.
*H04N 9/75* (2006.01)
*H04N 9/31* (2006.01)
*H04N 9/44* (2006.01)

(52) U.S. Cl.
CPC .............. *H04N 9/75* (2013.01); *H04N 9/3182* (2013.01); *H04N 9/44* (2013.01)

(58) Field of Classification Search
CPC .......... H04N 9/75; H04N 9/3182; H04N 9/31; H04N 9/44; H04N 5/222
USPC ..................................... 348/592, 587; 345/84
See application file for complete search history.

(56) References Cited

U.S. PATENT DOCUMENTS

| | | | |
|---|---|---|---|
| 5,342,517 | A | 8/1994 | Kopf |
| 5,593,580 | A | 1/1997 | Kopf |
| 5,601,727 | A | 2/1997 | Bormann et al. |
| 6,290,359 | B1 | 9/2001 | Shriver |
| 6,312,591 | B1 | 11/2001 | Vassarotti et al. |

(Continued)

FOREIGN PATENT DOCUMENTS

| | | |
|---|---|---|
| EP | 0581221 | 3/1999 |
| WO | WO-2011-071700 | 6/2011 |

(Continued)

OTHER PUBLICATIONS

European Extended Search Report, International Application No. 19159491.0, dated Aug. 26, 2019, 11 pages.

(Continued)

*Primary Examiner* — Sherrie Hsia
(74) *Attorney, Agent, or Firm* — Adsero IP

(57) ABSTRACT

A chroma key and presentation system, a presentation method, and a presentation kit all for simultaneous use in the presence of an in-person audience and remote audience. The system comprising: a chroma key light source, configured in use to emit chroma key light; a display surface which may be used as a projector screen for displaying projected media for viewing by the in-person audience from a projector, the display surface being at least partially transparent to the chroma key light; a camera disposed on an opposing side of the display surface to the chroma key light source, wherein the camera is configured to receive chroma key light for use in generating a composite image for the remote audience; and a directional light control filter, configured to reduce chroma key light transmission in a direction away from the camera.

19 Claims, 5 Drawing Sheets

(56) References Cited

U.S. PATENT DOCUMENTS

| | | |
|---|---|---|
| 6,490,006 B1 * | 12/2002 | Monjo .................. H04N 5/272 |
| | | 348/592 |
| 6,674,485 B2 * | 1/2004 | Akiyama ................ H04N 9/75 |
| | | 348/592 |
| 6,837,995 B1 | 1/2005 | Vassarotti et al. |
| 7,418,197 B2 | 8/2008 | Didow et al. |
| 7,894,713 B1 | 2/2011 | Clark |
| 8,072,481 B1 | 12/2011 | McNelley et al. |
| 8,992,050 B1 | 3/2015 | Yuan et al. |
| 10,382,706 B2 | 8/2019 | Scharer, III et al. |
| 10,474,006 B2 | 11/2019 | Ariav et al. |
| 2008/0043100 A1 | 2/2008 | Sobel et al. |
| 2013/0044466 A1 | 2/2013 | Scharer, III |
| 2018/0007314 A1 | 1/2018 | O'Connell |

FOREIGN PATENT DOCUMENTS

| | | |
|---|---|---|
| WO | WO-2016-162837 | 10/2016 |
| WO | WO-2020-021067 | 1/2020 |

OTHER PUBLICATIONS

International Search Report & Written Opinion, International Application No. PCT/EP2020/054265, dated Apr. 9, 2020, 13 pages.
Combined Search and Examination Report issued in Application No. GB 2013713.9, dated Apr. 15, 2021.

* cited by examiner

CHROMA KEY AND PRESENTATION SYSTEM, METHOD, AND KIT

RELATED APPLICATIONS

This application claims priority to GB-2013713.9 filed on Sep. 1, 2020, entitled "A CHROMA KEY AND PRESENTATION SYSTEM, METHOD, AND KIT", of which is incorporated herein by reference in entirety.

FIELD OF THE INVENTION

The present invention relates to a presentation system, a method for presenting, and a presentation kit.

BACKGROUND

Chroma key composition techniques are well known and commonly used within media and broadcasting industries. The technique involves capturing an image or video of a chroma key subject (e.g. a news presenter) against a chroma key background, usually of uniform colour. The colour of the chroma key background is most often chosen as green or blue (due to distinctive differences in hue to that of human skin tones). The chroma key background commonly consists of a light-weight sheet of material, which may be mounted or hung against a wall. In other settings, an outdoor tent may be used to house the chroma key background or the background is provided by chroma key backlight. The materials are chosen to have minimal reflective properties to minimise glare and, therefore, facilitate effective chroma key composition.

Currently, chroma key backgrounds are used in studios without a live-show audience present. Instead, processed media is intended for transmission to remote audiences, either during a live stream (such as a news segment), or via various other modes of broadcast (such as in a movie theatre). In either case, only the remote audience, not present at the studio are entertained/considered.

However, it would be desirable to provide a presentation system in which chroma key composition can be performed in the presence of live audience who are unaware/minimally perceive of the chroma key background. Such that chroma key compositing transmission to a remote audience is done, whilst simultaneously presenting the chroma key subject and media to a live-audience.

There is therefore a need for a concealed chroma key and presentation system that is minimally discernible to live audience so it can be used before a live audience and remote audience simultaneously.

SUMMARY

According to a first aspect, embodiments of the present invention provide a chroma key and presentation system, for simultaneous use in the presence of an in-person audience and remote audience, comprising:
- a chroma key light source, configured in use to emit chroma key light;
- a display surface, that can be used as projector screen for displaying projected media for viewing by the in-person audience, the display surface being at least partially transparent to the chroma key light;
- a camera, disposed on an opposing side of the display surface to the chroma key light source, wherein the camera is configured to receive chroma key light for use in generating a composite image for the remote audience; and
- a directional light control filter, configured to reduce chroma key light transmission in a direction away from the camera.

Advantageously, the display surface may simultaneously display projected media for viewing by a live audience, and provide a chroma key background for use in a live stream. The transparency of the display surface to the chroma key light facilitates transmission of the chroma key light from the chroma key light source to the camera (via the display surface). In this way, the system is dual-functional serving simultaneously as a chroma key screen and a projector screen.

The presentation system may have any one or, to the extent that they are compatible, any combination of the following optional features.

The display surface may be used as projector screen for either front and/or rear projection. The system may include a projector, configured to project media onto either a front or rear of the display surface. The display surface may be comprised of plastic, PVC, polypropylene or other materials suitable for front and/or rear projection. In some embodiments, the display surface may include a graphic on a surface thereof, so as to work as a backdrop banner when the projector is turned off.

In some embodiments, the directional light control filter may be configured to permit maximum transmission of the chroma key light in a first direction and reduce transmission of the chroma key light in a second direction relative to the first direction; wherein the second direction is at a non-zero angle to the first direction, and wherein the display surface is disposed on an opposing side of the directional light control filter to the chroma key light source, and is aligned with the second direction.

By chroma key light, it may be meant light suitable for use in a chroma key composition process. For example, the chroma key light may be highly contrasting with a chroma key subject. In some embodiments, the chroma key light may be emitted at a single frequency or narrow band of frequencies, or may in some other way be uniform, and therefore easily discernible by the camera. In some embodiments, the chroma key light is green or blue The projector may be located on a same side of the display surface to the camera. The system may further comprise a computer, connected to the camera, and configured to perform chroma key composition using images captured by the camera. In some embodiments, the computer may be further connected to the projector, and may be configured to use the media being presented on the projector when performing the chroma key composition. Alternatively the computer may have, locally stored, the media being presented by the projector, and utilise this local copy when performing the chroma key composition.

The camera may be aligned with the first direction, that is, the camera may be positioned to capture chroma key light travelling in the first direction. The first direction may be perpendicular to a surface of the directional light control filter.

In this way, the camera receives maximum transmission of the chroma key light for effective chroma key composition, and transmission of chroma key light in the direction aligned with the display surface is reduced. As such, the visibility of chroma key light to a live-audience oriented to view the displayed media may be greatly reduced, without affecting the efficacy of simultaneous chroma key composition.

The directional light control filter may comprise a linear array of light-filters.

The linear array of light-filters may extend across a length of the display surface so as to provide a uniform field of chroma key light suitable for chroma key composition. The display surface may extend at a non-zero angle relative to the linear array of light-filters. Accordingly, the presentation system may be arranged so as to have a trapezoidal cross section.

The directional light control filter may comprise a formation of alternating light-filter portions and light-blocker portions, wherein each of the light-filter portions are oriented in the first direction and the light-blocker portions, oriented in another direction are opaque to the chroma key light.

The respective surfaces of each of the alternating light-filter portions and light-blocker portions may be at an angle of at least 30 and no more than 150 degrees relative to adjacent surfaces. The angle may be 90 degrees.

In this way, the directional light control filter may be arranged in a zigzag formation. Advantageously, the directional light control filter and the display surface may be arranged in parallel, which reduces the overall size of the presentation system. Accordingly, the presentation system may be arranged so as to have a rectangular cross section.

The presentation system may further comprise a second display surface disposed on an opposing side of the directional light control filter to the chroma key light source, wherein the second display surface is aligned with a third direction, the third direction being at a non-zero angle relative to the first direction and the second direction, such that transmission of the chroma key light through the second display surface in the third direction is reduced relative to the first direction.

The camera may be aligned with the first direction.

The camera may receive maximum transmission of the chroma key light for effective chroma key composition, and transmission of chroma key light both through the display surface and through the second display surface is reduced. As such, the visibility of chroma key light to both a first in-person audience (viewing media displayed on the display surface) and to a second in-person audience (viewing media displayed on the second display surface) may be greatly reduced, without affecting the efficacy of simultaneous chroma key composition.

In some embodiments, a side of the second display surface is disposed immediately adjacent to a side of the display surface, such that the display surface and the second display surface are arranged in a V-shape formation.

A first area and second area for an in-person audience may be arranged on either side of the V-shape formation, and the camera may be located in between the first and second areas. In use, each audience may view displayed media on respective display surfaces, and chroma key light intensity may be reduced within their field of view, whereas the centrally located camera may receive maximum transmission of the chroma key light. The V-shape formation comprises an open end and a vertex, the V-shape formation may be oriented such that the vertex is located on an opposing side of the open end to the chroma key light source. The line of symmetry of the V-shape formation may be aligned with the first direction.

The presentation system may further comprise a second directional light control filter located between the chroma key light source and the display surface.

The directional light control filter may comprise a linear array of light-filters, and the second directional light control filter may comprise a second linear array of light-filters.

Advantageously, the inclusion of a second directional light control filter enhances the filtration effect. In this way, the intensity of chroma key light transmission in the second direction may be further reduced.

The linear array of light-filters may extend at a non-zero angle relative to the second linear array of light-filters. This can enhance the degree to which light outside of the viewing angle is filtered.

The directional light control filter may comprise a linear array of light-filters, and the second directional control light filter may comprise a formation of alternating light-filter portions and light-blocker portions, wherein each of the light-filter portions are oriented in the first direction and the light-blocker portions, oriented in another direction, are opaque to the chroma key light.

The second directional light control filter may have any combination, where compatible, of the features of the directional light control filter (which may be referred to as the first directional light control filter).

A viewing angle of the directional light control filter may be at least 20 degrees and no more than 120 degrees. The viewing angle may be 60 degrees.

The camera may be located within the viewing angle.

The directional light control filter permits maximum transmission of the chroma key light in the first direction, and reduces transmission in directions at a non-zero angle to the first direction (that is, outside the viewing angle). The viewing angle corresponds to the angular range of transmission directions outside of which the intensity of light is reduced below a threshold intensity. The extent of intensity reduction may be related, e.g. proportional, to the size of the transmission angle relative to the first direction. For example, for a viewing angle of 60 degrees, the intensity of chroma key light in transmission directions that are angled at least 30 degrees relative to the first direction are reduced below the threshold value. In this case, the angular intensity spectrum is maximised in the first direction, and reduces to the threshold value at +−30 degrees relative to the first direction. The threshold intensity may be 5% of the maximum intensity.

Advantageously, the intensity of chroma key light transmitted in the second direction is reduced, and an in-person audience oriented to view the display surface only receive a reduced intensity of chroma key light.

The second direction may be outside the viewing angle. In this way, the intensity of chroma key light transmitted in the second direction is reduced below a threshold value and, to an in-person audience oriented to view the display surface, the directional light control filter appears as a dark surface. Further, the projected media displayed on the display surface may be clearly visible to the in-person audience, whereas visibility of the chroma key light may be greatly reduced.

Similarly, in embodiments comprising a second display surface, the third direction may be outside the viewing angle.

The presentation system may further comprises a filter, located between the display surface and the camera, and configured to filter non-chroma key light.

Advantageously, the intensity of non-chroma key light received by the camera is reduced, which increases the efficacy of chroma key composition. The non-chroma key light may include a reflection of the displayed media on the display surface.

The presentation system may comprise a computer for performing the chroma key composition.

According to a second aspect of the invention, there is provided a method for presenting using the chroma key and presentation system of the first aspect, comprising the steps of:
emitting the chroma key light; and
simultaneously displaying media on the display surface, and capturing the chroma key light at the camera.

In the method of the second aspect, the presentation system may comprise any one, or any combination insofar as they are compatible, of the optional features of the presentation system of the first aspect.

The method for presenting may further include the step of providing a chroma key subject, such that a field of view of the camera encompasses a portion of the chroma key light superimposed by the chroma key subject.

The chroma key subject may be located within the viewing angle of a directional light control filter.

The chroma key subject may be located between the chroma key light source and the camera. The first direction may be aligned with a line intersecting the chroma key subject and the camera.

The chroma key subject may be a presenter.

The chroma key light source may be configured to emit light that visually contrasts with the chroma key subject. For embodiments in which the chroma key subject is an in-person presenter, the chroma key light source may emit green or blue light, which possess distinctive differences in hue to that of human skin tones.

The projected media may be displayed to an in-person audience, and the method for presenting may further include the steps of:
performing real-time chroma key composition of the portion of the chroma key light superimposed by the chroma key subject; and
streaming a live feed of the real-time chroma key composition.

Advantageously, chroma key composition of the chroma key subject can be performed for remote transmission, whilst simultaneously presenting the chroma key subject and projected media to an in-person audience. The projected media may be the same as or different to the media with which the chroma key subject is composited during chroma key composition.

The in-person audience may be located outside the viewing angle of a directional light control filter, as such, projected media displayed on the display surface may be clearly visible to the in-person audience, whereas visibility of the chroma key light to the in-person audience may be greatly reduced.

According to a third aspect of the invention, there is provided a chroma key and presentation kit comprising:
a chroma key light source, configured in use to emit chroma key light;
a display surface for displaying projected media from a projector, the display surface being at least partially transparent to the chroma key light;
a camera configured to capture the chroma key light; and
a directional light control filter configured, in use, to reduce chroma key light transmission in a direction away from the camera.

The directional light control filter may be configured to permit maximum transmission of the chroma key light in a first direction and reduce transmission of the chroma key light in a second direction relative to the first direction.

The kit may further comprise a projector, configured to project media onto the display surface.

The presentation kit may be configured to carry out the method of the second aspect.

The presentation kit may be arrangeable as the system of the first aspect, and may contain any one, or any combination insofar as they are compatible, of the optional features of the presentation system of the first aspect.

In all aspects of the invention, the chroma key light source may emit green or blue light.

In all aspects of the invention, the chroma key light source may comprise an LED.

In all aspects of the invention, the chroma key light source may emit infrared light and the camera may be configured to capture infrared light. Advantageously, infrared light is not within the visible spectrum and therefore not visible to an in-person audience.

BRIEF DESCRIPTION OF THE DRAWINGS

Embodiments of the invention will now be described by way of example with reference to the accompanying drawings in which.

DETAILED DESCRIPTION

Aspects and embodiments of the present invention will now be discussed with reference to the accompanying figures. Further aspects and embodiments will be apparent to those skilled in the art.

Figure 1:
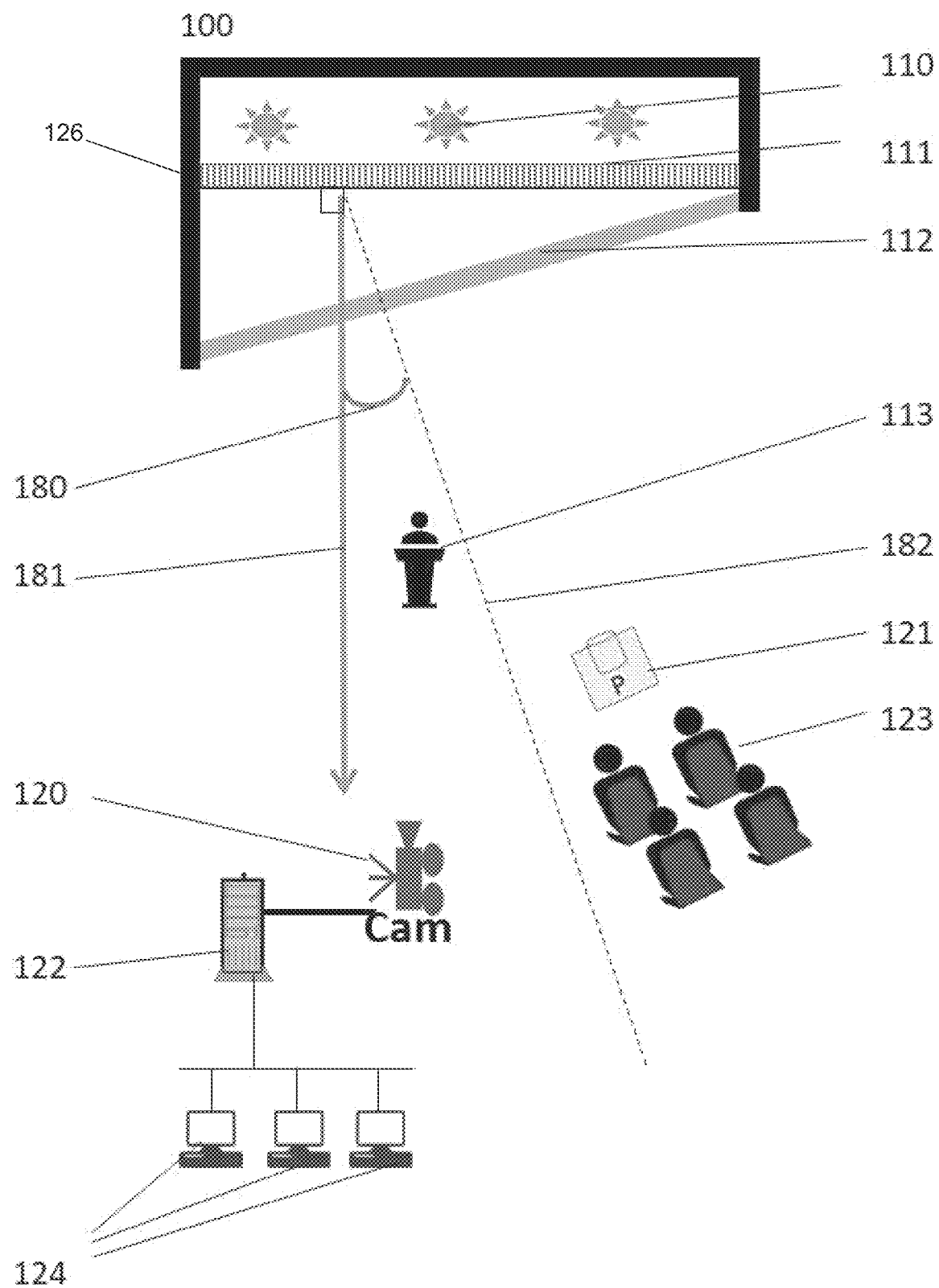
FIG. 1 shows a plan view of a first embodiment of the invention.

FIG. 1 depicts a presentation system 100 including a chroma key light source 110 (in this embodiment an array of light sources), a directional light control filter 111 and a display surface used as projector screen 112. The projector screen is located on an opposing side of the directional light control filter to the chroma key light source. The presentation system 100 is arranged so as to have a trapezoidal cross section i.e. the boundary formed by a plurality of sidewalls 126 and the projector screen 112 form a trapezoidal shape. The directional light control filter 111 permits maximum transmission of the chroma key light in a first direction 181, and reduces transmission in directions at a non-zero angle to the first direction. Angle 180 corresponds to one half of the viewing angle, i.e. half the angular range outside of which the intensity of chroma key light is reduced below a threshold intensity. The extent of intensity reduction is related to the size of the transmission angle relative to the first direction. The angular intensity spectrum is maximised in the first direction 181, and reduces to the threshold value at transmission direction 182. Optionally, the directional light control filter 111 comprises micro louvers. Optionally, the directional light control filter 111 is a '3M' ALCF-P ABR0 Privacy Filter.

An in-person audience 123 are located to one side, and oriented to view the display surface of projector screen 112 and only receive a reduced intensity of chroma key light. The in-person audience 123 are located outside the viewing angle. In this way, the intensity of chroma key light transmitted to the in-person audience 123 is reduced below the threshold value and the directional light control filter 111 appears as a dark surface. Projector 121 projects media on to the display surface of projector screen 112 and the projected media is clearly visible to the in-person audience, whereas visibility of the chroma key light is greatly reduced.

A camera 120 is located within the angle 180. The projector screen 112 is transparent to the chroma key light, which facilitates transmission of the chroma key light from the chroma key light source 110 to the camera 120 (via the projector screen 112). The camera 120 is aligned with the first direction 181. In this way, the camera 120 receives maximum transmission of the chroma key light for effective chroma key composition.

The camera 120 is connected to a computer 122 with chroma key software for performing chroma key composition.

A chroma key subject 113 is located within angle 180, such that the field of view of camera 120 encompasses a portion of the chroma key light superimposed by the chroma key subject 113. The chroma key subject 113 is located between the chroma key light source 110 and the camera 120. The first direction 181 is aligned with the line intersecting the chroma key subject and the camera. In this embodiment, the chroma key subject 113 is an in-person presenter.

The projected media is displayed to the in-person audience 123 and, simultaneously, computer 122 performs real-time, or near real-time, chroma key composition of the portion of the chroma key light superimposed by the chroma key subject 113. A live feed of the chroma key composition is streamed to a remote audience 124 i.e. one or more computers connected over a network (e.g. the internet) to computer 122.

Accordingly, chroma key composition of the chroma key subject 113 is performed for remote transmission to remote audience 124, whereas the chroma key subject 113 and projected media are presented to in-person audience 123.

Figure 2:
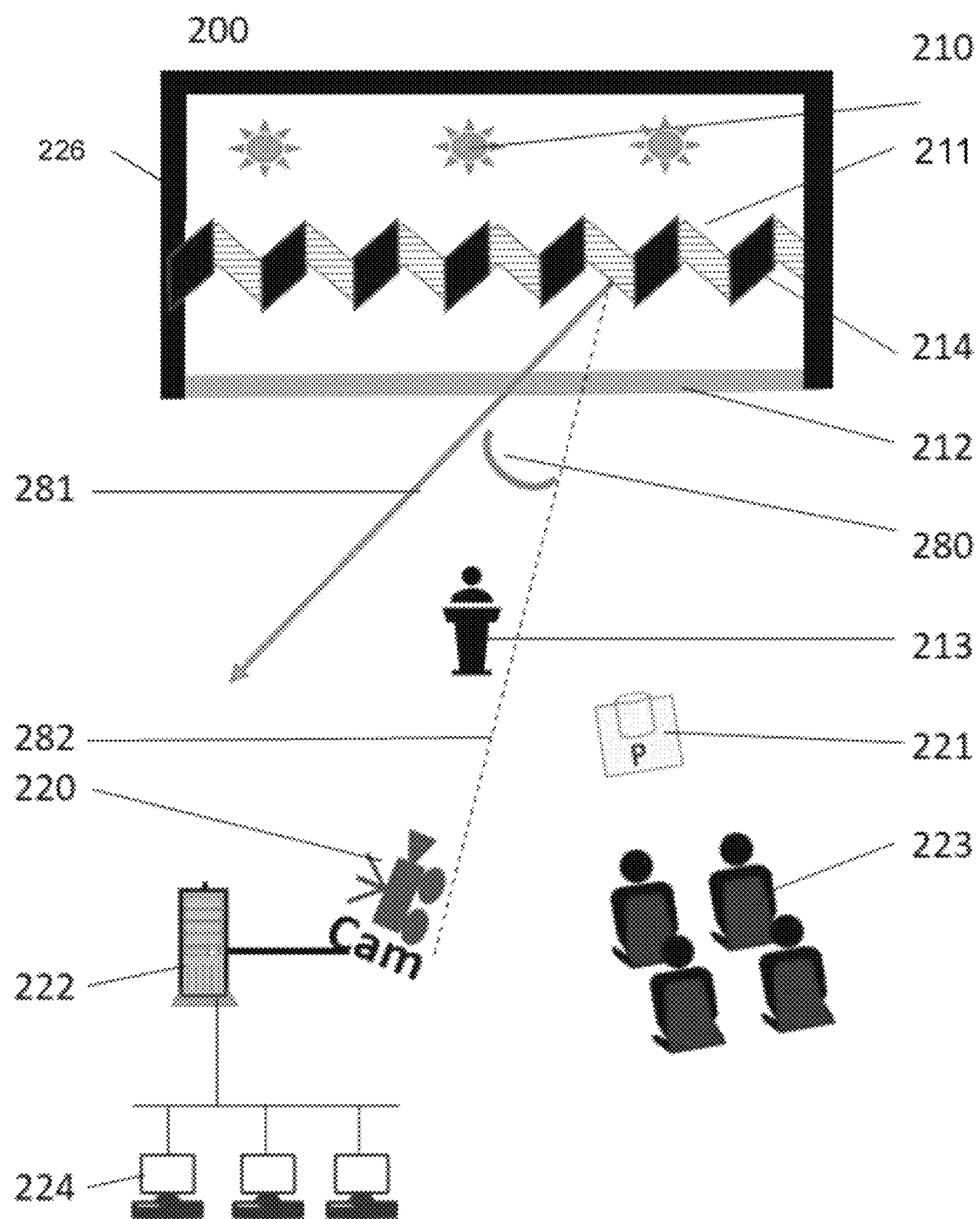
FIG. 2 shows a plan view of a second embodiment of the invention.

FIG. 2 depicts a presentation system 200 including a chroma key light source 210 (in this example an array of light sources), a directional light control filter 211 and a display surface used as projector screen 212. The projector screen is located on an opposing side of the directional light control filter to the chroma key light source 210. The presentation system 200 is arranged so as to have a rectangular cross section i.e. the boundary formed by a plurality of sidewalls 226 and the projector screen 212 form a rectangular shape. The directional light control filter 211 permits maximum transmission of the chroma key light in a first direction 281, and reduces transmission in directions at a non-zero angle to the first direction 281. The angle 280 corresponds to half the viewing angle, i.e. half the angular range outside of which the intensity of chroma key light is reduced below a threshold intensity. The extent of intensity reduction is related to the size of the transmission angle relative to the first direction 281. The angular intensity spectrum is maximised in the first direction 281, and reduces to the threshold value at transmission direction 282.

Directional light control filter 211 may comprises a formation of alternating light-filter portions and light-blocker portions 214, wherein each of the light-filter portions are oriented in the first direction 281 and the light-blocker portions 214 are opaque to the chroma key light.

The respective surfaces of each of the alternating light-filter portions and light-blocker portions are at an angle of 90 degrees. Accordingly, the directional light control filter 211 is arranged in a zigzag formation.

An in-person audience 223 are oriented to view the display surface of projector screen 212 and only receive a reduced intensity of chroma key light. The in-person audience 223 are located outside angle 280. In this way, the intensity of chroma key light transmitted to the in-person audience 223 is reduced below the threshold value and the directional light control filter 211 appears as a dark surface. Projector 221 projects media on to the display surface of projector screen 212 and the projected media is clearly visible to in-person audience 223, whereas visibility of the chroma key light is greatly reduced.

A camera 220 is located within angle 280. The projector screen 212 is transparent to the chroma key light, which facilitates transmission of the chroma key light from the chroma key light source 210 to the camera 220 (via the projector screen 212). The camera 220 is connected to a computer 222 with chroma key software for performing chroma key composition.

The camera 220 is connected to a computer 222 with chroma key software for performing chroma key composition.

A chroma key subject 213 is located within angle 280, such that the field of view of camera 220 encompasses a portion of the chroma key light superimposed by the chroma key subject 213. The chroma key subject 213 is located between the chroma key light source 210 and the camera 220. In this embodiment, the chroma key subject 213 is an in-person presenter.

The projected media is displayed to in-person audience 223 and, simultaneously, computer 222 performs real-time, or near real-time, chroma key composition of the portion of the chroma key light superimposed by the chroma key subject 213. A live feed of the real-time chroma key composition is streamed to a remote audience 224.

Accordingly, chroma key composition of the chroma key subject 213 is performed for remote transmission to remote audience 224, whereas the chroma key subject 213 and projected media are presented to in-person audience 223.

Figure 3:
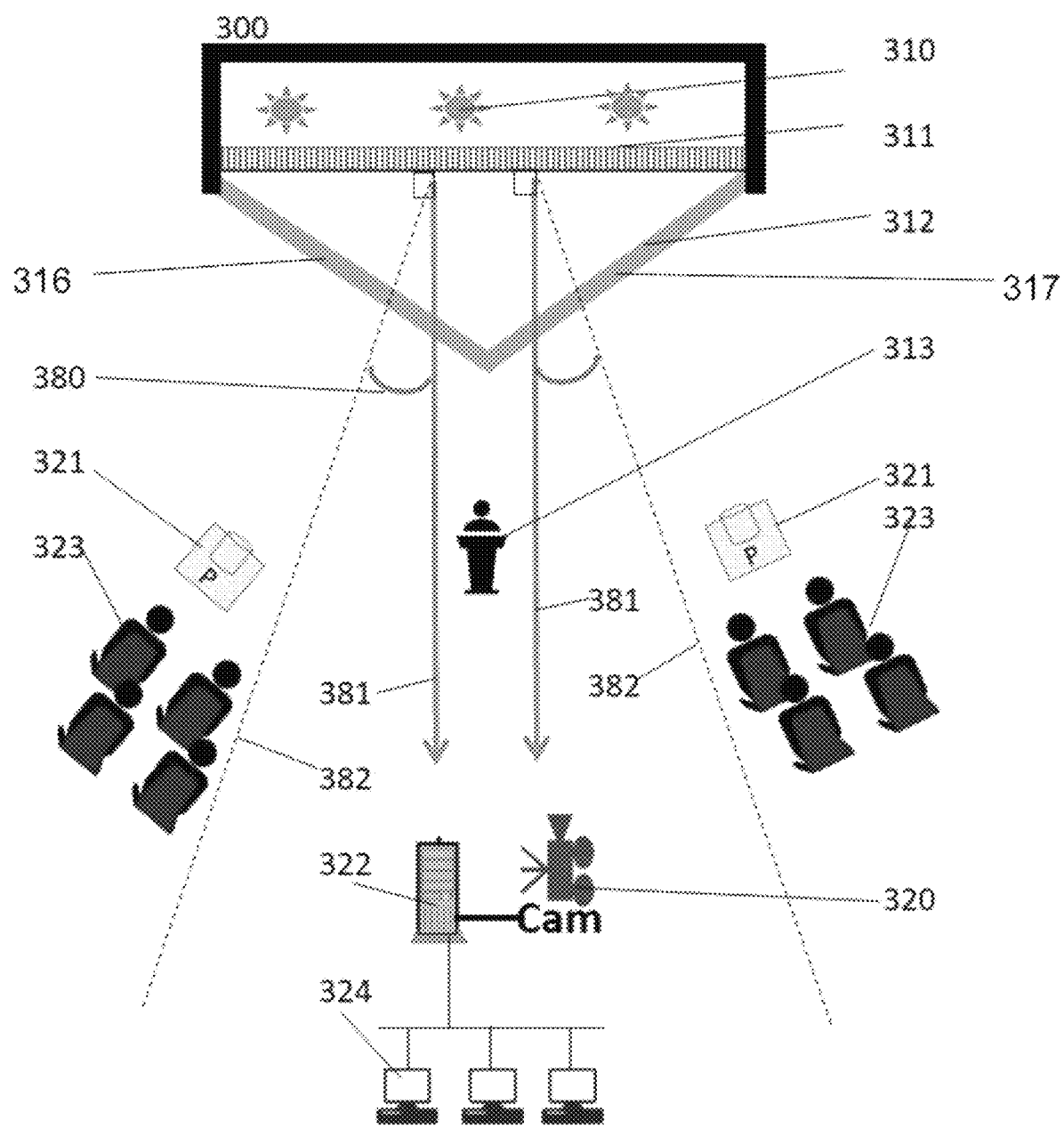
FIG. 3 shows a plan view of a third embodiment of the invention.

FIG. 3 depicts a presentation system 300 including a chroma key light source 310, a directional light control filter 311 and a projector screen 312. The directional light control filter 311 permits maximum transmission of the chroma key light in a first direction 381, and reduces transmission in directions at a non-zero angle to the first direction 381. The angle 380 corresponds to half the viewing angle, i.e. half the angular range outside of which the intensity of chroma key light is reduced below a threshold intensity. The extent of intensity reduction is related to the size of the transmission angle relative to the first direction 381. The angular intensity spectrum is maximised in the first direction 381, and reduces to the threshold value at transmission directions 382. Optionally, the directional light control filter 311 comprises micro louvers. Optionally, the directional light control filter 311 is a '3M' ALCF-P ABR0 Privacy Filter.

The projector screen is located on an opposing side of the directional light control filter 311 to the chroma key light source 310. In this embodiment the projector screen 312 comprises a combination of two projector screens; accordingly, projector screen 312 presents a first display surface 316 and a second display surface 317.

The two projector screens are disposed immediately adjacent to each other, such that projector screen 312 is arranged in a V-shape formation. An in-person audience 323 are arranged on either side of the V-shape formation, and camera 320 is located in between. The in-person audience 323 are located outside the viewing angle. Each side of in-person audience 323 are oriented to view displayed media on respective display surfaces of projector screen 312, and chroma key light intensity is reduced below the threshold within their field of view, whereas the centrally located camera 320 receives maximum transmission of the chroma key light. The camera 320 is located within the viewing angle and is aligned with the first direction 381. The V-shape formation comprises an open end and a vertex, the V-shape formation is oriented such that the vertex is located on an opposing side of the open end to the chroma key light source 310. The line of symmetry of the V-shape formation may be aligned with the first direction 381.

Projectors 321 project media on to the display surfaces 316 and 317 of projector screen 312 and the projected media is clearly visible to in-person audience 323, whereas visibility of the chroma key light is greatly reduced. The projector screen 312 is transparent to the chroma key light, which facilitates transmission of the chroma key light from the chroma key light source 310 to the camera 320 (via the projector screen 312).

A chroma key subject 313 is located in between camera 320 and projector screen 312, such that the field of view of camera 320 encompasses a portion of the chroma key light superimposed by the chroma key subject 313. The chroma key subject 313 is located within the viewing angle. The camera 320 is connected to computer 322 with chroma key software, which performs real-time, or near real-time, chroma key composition of the portion of the chroma key light superimposed by the chroma key subject 313. A live feed of the real-time chroma key composition is streamed to a remote audience 324.

Accordingly, chroma key composition of the chroma key subject 313 is performed for remote transmission to remote audience 324, whereas the chroma key subject 313 and projected media are presented to in-person audience 323.

Figure 4A:
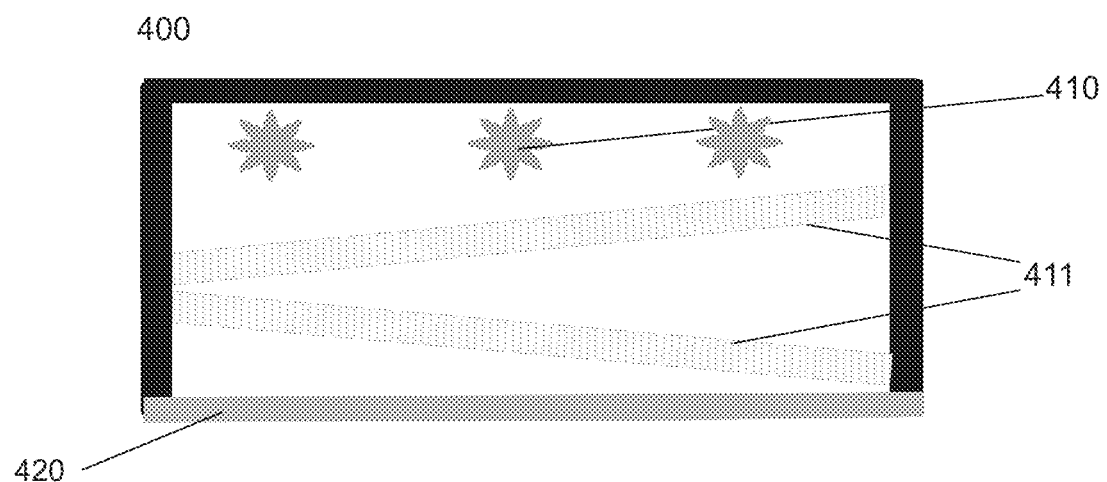
FIG. 4A shows a plan view of a fourth embodiment of the invention.

FIG. 4A depicts a presentation system 400 comprising a chroma key light source, as well as first and second directional light control filters 411. The first directional light control filter is a first linear array of light-filters, and the second directional light control filter is a second linear array of light-filters. The first linear array of light-filters extend at a non-zero angle relative to the second linear array of light-filters. The result of this is a further filtration of light, and so enhanced spatial selection i.e. increased filtering of light outside of the viewing angle. Optionally, directional light control filters 411 comprise micro louvers. Optionally, directional light control filter 411 are '3M' ALCF-P ABR0 Privacy Filters. The display surface is shown as 420.

Figure 4B:
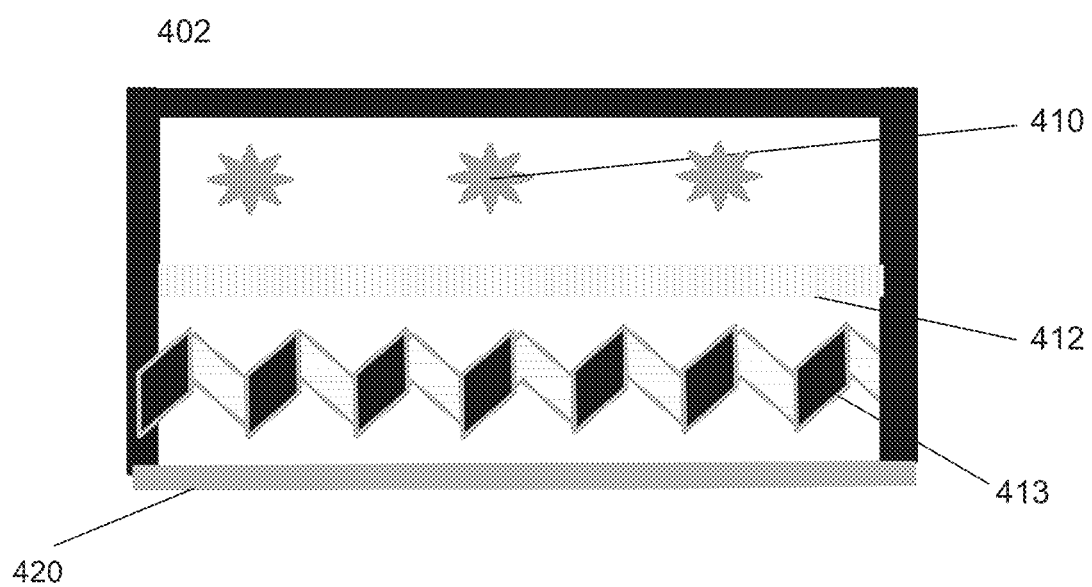
FIG. 4B shows a plan view of a fifth embodiment of the invention.

FIG. 4B depicts a presentation system 402 comprising a first directional light control filter 412 and a second directional light control filter 413. The first directional light control filter 412 is a linear array of light-filters, and the second directional light control filter 413 is a formation of alternating light-filter portions and light-blocker portions. As before, the first and second directional light control filters are orientated in different directions. Optionally, directional light control filter 412 comprises micro louvers. Optionally, directional light control filter 412 is a '3M' ALCF-P ABR0 Privacy Filter. The display surface is shown as 420.

Figure 5A:
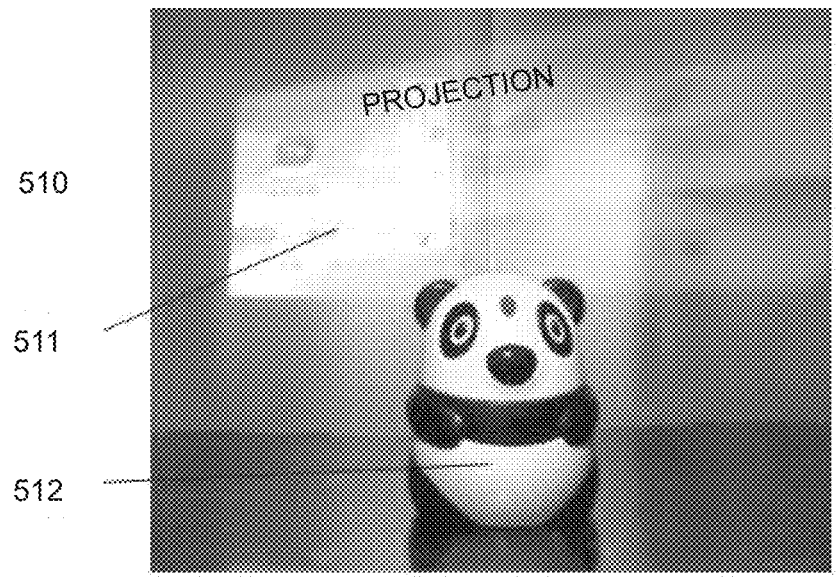
FIG. 5A shows an illustrative view of chroma key subject during use of a system according to an embodiment of the present invention, as seen by live audience.

In accordance with the present invention, FIG. 5A depicts a field of view 510 of an in-person audience viewing displayed media 511 and chroma key subject 512.

Figure 5B:
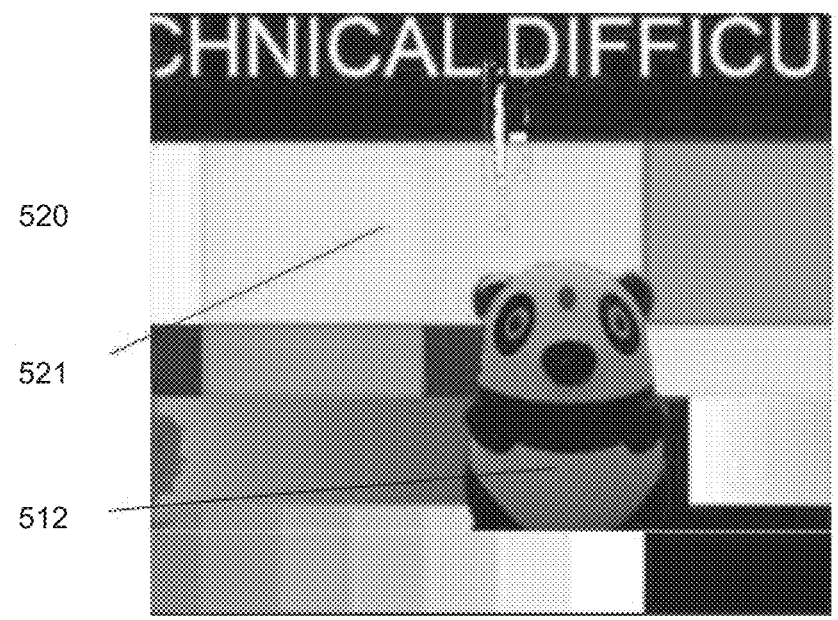
FIG. 5B shows an illustrative view of a chroma key subject during use of a system according to an embodiment of the present invention, as seen by a remote audience.

In accordance with the present invention, FIG. 5B depicts a chroma key composition 520 of chroma key subject 512 and background media 521.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A chroma key and presentation system, for simultaneous use in the presence of an in-person audience and remote audience, comprising:
    a chroma key light source, configured in use to emit chroma key light;
    a display surface, that can be used as projector screen for displaying projected media for viewing by the in-person audience, the display surface being at least partially transparent to the chroma key light;
    a camera disposed on an opposing side of the display surface to the chroma key light source, wherein the camera is configured to receive chroma key light for use in generating a composite image for the remote audience; and
    a directional light control filter, configured to reduce chroma key light transmission in a direction away from the camera wherein the directional light control filter is configured to permit maximum transmission of the chroma key light in a first direction and reduce transmission of the chroma key light in a second direction relative to the first direction; wherein the second direction is at a non-zero angle to the first direction, and wherein the display surface is disposed on an opposing side of the directional light filter to the chroma key light source, and aligned with the second direction.

2. The chroma key and presentation system of claim 1, wherein the directional light control filter comprises a linear array of light-filters.

3. The chroma key and presentation system of claim 1, the directional light control filter comprising a formation of alternating light-filter portions and light-blocker portions, wherein each of the light-filter portions are oriented in the first direction and the light-blocker portions are opaque to the chroma key light.

4. The chroma key and presentation system of claim 3, wherein respective surfaces of each of the alternating light-filter portions and light-blocker portions are at an angle of at least 30 and no more than 150 degrees relative to adjacent surfaces.

5. The chroma key and presentation system of claim 4, wherein the angle is 90 degrees.

6. The chroma key and presentation system of claim 1, further comprising a second display surface disposed on an opposing side of the directional light control filter to the chroma key light source, wherein the second display surface is aligned with a third direction, the third direction being at a non-zero angle relative to the first direction and the second direction, such that transmission of the chroma key light through the second display surface in the third direction is reduced relative to the first direction.

7. The chroma key and presentation system of claim 6, wherein a side of the second display surface is disposed immediately adjacent to a side of the display surface, such that the display surface and the second display surface are arranged in a V-shape formation.

8. The chroma key and presentation system of claim 1, further comprising a second directional light control filter located between the chroma key light source and the display surface.

9. The chroma key and presentation system of claim 8, wherein:
the directional light control filter comprises a linear array of light-filters; and
the second directional light control filter comprises a second linear array of light-filters.

10. The chroma key and presentation system of claim 9, wherein the linear array of light-filters extend at a non-zero angle relative to the second linear array of light-filters.

11. The chroma key and presentation system of claim 8, wherein:
the directional light control filter comprises a linear array of light-filters; and
the second directional light control filter comprises a formation of alternating light-filter portions and light-blocker portions, wherein each of the light-filter portions are oriented in the first direction and the light-blocker portions, oriented in another direction, are opaque to the chroma key light.

12. The chroma key and presentation system of claim 1, wherein a viewing angle of the directional light control filter is at least 20 degrees and no more than 120 degrees.

13. The chroma key and presentation system of claim 12, wherein the viewing angle is 60 degrees.

14. The chroma key and presentation system of claim 12, wherein the second direction is outside the viewing angle.

15. The chroma key and presentation system of claim 1, further comprising a filter, located between the display surface and the camera, and configured to filter non-chroma key light.

16. The chroma key and presentation system of claim 1, further comprising a projector configured to project media onto either a front or rear of the display surface.

17. A method for presenting using the chroma key and presentation system of claim 1, comprising the steps of:
emitting the chroma key light; and
simultaneously displaying projected media on the projector screen, and capturing the chroma key light at the camera.

18. The method of claim 17, further including the step of providing a chroma key subject, such that a field of view of the camera encompasses a portion of the chroma key light superimposed by the chroma key subject.

19. The method of claim 18, wherein the projected media is displayed to a live- audience, and further including the steps of:
performing real-time chroma key composition of the portion of the chroma key light
superimposed by the chroma key subject; and
streaming a live feed of the real-time chroma key composition.

* * * * *